(12) United States Patent
Hayashi

(10) Patent No.: US 10,356,265 B2
(45) Date of Patent: Jul. 16, 2019

(54) IMAGE PROCESSING APPARATUS AND APPLICATION MANAGEMENT METHOD

(71) Applicant: CANON KABUSHIKI KAISHA, Tokyo (JP)

(72) Inventor: Ruri Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/825,455

(22) Filed: Nov. 29, 2017

(65) Prior Publication Data

US 2018/0176406 A1 Jun. 21, 2018

(30) Foreign Application Priority Data

Dec. 16, 2016 (JP) .................................. 2016-244540

(51) Int. Cl.
G06F 3/12 (2006.01)
H04N 1/00 (2006.01)

(52) U.S. Cl.
CPC ....... H04N 1/00938 (2013.01); G06F 3/1203 (2013.01); G06F 3/123 (2013.01); G06F 3/1231 (2013.01); H04N 1/00408 (2013.01); H04N 2201/0094 (2013.01)

(58) Field of Classification Search
CPC ........... H04N 1/00938; H04N 1/00408; H04N 1/00411; H04N 1/00413; H04N 2201/0094; H04N 1/0094; G06F 3/1231; G06F 3/1203
See application file for complete search history.

(56) References Cited

U.S. PATENT DOCUMENTS

| 9,740,444 B2 | 8/2017 | Hayashi | |
|---|---|---|---|
| 2002/0051164 A1* | 5/2002 | Watanabe | G06Q 30/06 358/1.13 |
| 2007/0206211 A1* | 9/2007 | Okutsu | G03G 15/50 358/1.14 |
| 2009/0271304 A1* | 10/2009 | Yamada | G06Q 30/0284 705/34 |
| 2011/0162036 A1* | 6/2011 | Heo | G06F 21/31 726/1 |
| 2012/0054758 A1* | 3/2012 | Wataishi | G06Q 10/06 718/102 |
| 2015/0092225 A1* | 4/2015 | Kaigawa | G06F 3/1238 358/1.14 |
| 2016/0070553 A1* | 3/2016 | Hogan | G06F 8/62 717/168 |

FOREIGN PATENT DOCUMENTS

JP 2009189659 A 8/2009

* cited by examiner

*Primary Examiner* — Moustapha Diaby
(74) *Attorney, Agent, or Firm* — Venable LLP

(57) ABSTRACT

When a lock instruction to an application is received from an instruction issuer who has specific authorization after the application has been stopped, the stopped state is maintained, and a state transition is not allowed. In this way, the state of the application is maintained in an image forming apparatus, and the use of the application cannot be started, thereby preventing a user from restarting the use of the application. Furthermore, when the application is allowed to be used again, the original state can be restored without imposing any load. Also, user data can be reused without being deleted.

20 Claims, 16 Drawing Sheets

FIG 7

| BUNDLE | STATE |
|---|---|
| App1 | STOPPED AND LOCKED |
| App2 | STOPPED |
| App3 | STOPPED AND LOCKED |

F I G 11

| BUNDLE | STATE | INSTRUCTION SOURCE IDENTIFIER) |
|---|---|---|
| App1 | STOPPED AND LOCKED | 00000000-000 0-0000-0000- 000000000001 |
| App2 | STOPPED | - |
| App3 | STOPPED AND LOCKED | 00000000-000 0-0000-0000- 000000000002 |

FIG 15

| BUNDLE | STATE | INSTRUCTION SOURCE IDENTIFIER) |
|---|---|---|
| App5 | STARTED | - |
| App6 | STARTED AND LOCKED | 00000000-0000-0000-0000-000000000002 |

IMAGE PROCESSING APPARATUS AND APPLICATION MANAGEMENT METHOD

BACKGROUND OF THE INVENTION

Field of the Invention

The present invention relates to management of an application program on an image forming apparatus.

Description of the Related Art

In recent years, an application operation environment, typically a Java™ environment, is provided for image forming apparatuses (hereinafter, the trademark sign will be omitted). Techniques have been suggested that provide expandable applications by taking advantage of the program portability offered by Java. To improve the functions and usability of the image forming apparatuses, applications that operate under the aforementioned Java environment and other environments have been created; when installed in the image forming apparatuses, these applications can achieve desired functions. One example of application platforms is the Open Services Gateway initiative (OSGi) service platform (hereinafter, OSGi), which is a Java application platform for embedded devices. OSGi defines bundles as management units of software modules, and defines the specifications for managing a life cycle composed of installation, start, stop, update, and uninstallation. In this context, a bundle denotes a Java module, and is synonymous with an application in the present specification. Therefore, hereinafter, an application will be referred to as a bundle.

With respect to a bundle that operates when installed in an image forming apparatus, a user can issue an instruction for installation, start, stop, update, and uninstallation. However, when the usage fee for a non-free bundle is not paid or when the support for the image forming apparatus has expired, an external system for the user may want to perform control to forcedly suspend the use of the bundle so that the user cannot use the bundle. A method has been suggested that, when a bundle that should not be used exists in an image forming apparatus or another device, suspends the use of the bundle by detecting and forcedly uninstalling the bundle upon activation (Japanese Patent Laid-Open No. 2009-189659).

However, this method is problematic because, when the user is allowed to use the bundle again upon completion of payment of the outstanding usage fee for the bundle, the bundle needs to be reinstalled, thereby imposing a workload on the user. Another problem is that, as user data of the bundle is deleted by uninstalling the bundle, reusing the bundle as before requires restoration of the user data.

SUMMARY OF THE INVENTION

The present invention provides a mechanism that prevents a user from using a bundle without uninstalling the bundle.

According to an aspect of the present invention, there is provided an information processing apparatus capable of executing applications, the information processing apparatus comprising: a lock unit that, in response to a lock instruction, changes a state of a designated application to a locked state that does not allow a transition to another state; and an unlock unit that, in response to an unlock instruction from an instruction source that has authorization, unlocks the locked state of the designated application.

The present invention can provide a mechanism that prevents a user from using a bundle without uninstalling the bundle.

Further features of the present invention will become apparent from the following description of exemplary embodiments with reference to the attached drawings.

BRIEF DESCRIPTION OF THE DRAWINGS

FIG. 7 shows an example of management of locked states of stopped bundles.

FIG. 11 shows an example of management of instruction sources that locked bundles that are currently stopping.

FIG. 15 shows an example of management of instruction sources that locked bundles that are currently starting.

DESCRIPTION OF THE EMBODIMENTS

The following describes an embodiment of the present invention using the drawings.

<Description of Terms>

First, terms used in the present invention will be defined. "Lock" means to perform control so that an operation state of a bundle cannot be changed. For example, locking a bundle in a stopped state will place the bundle in a stopped and locked state. Normally, when a user has issued a start instruction with respect to a bundle in a stopped state, the bundle is placed in a started state, and its functions become usable. However, with respect to a bundle in a stopped and locked state, the stopped and locked state of the bundle does not change, even if the user issues a start instruction, because the bundle is controlled so that its state cannot be changed.

"Unlock" means to restore a bundle in a fixed state to its normal state. For example, unlocking a bundle in a stopped and locked state will restore the bundle to a stopped state. The user can change the state of a bundle that has been unlocked, and a bundle in a stopped state makes a transition to a started state when the user issues a start instruction with respect to the bundle in the stopped state.

This concludes the description of terms. Below, other terms will be additionally described where appropriate. An embodiment according to the present invention will now be described based on FIGS. 1 to 16.

<First Embodiment>
<Description of Exemplary Configuration of System>

Figure 1:
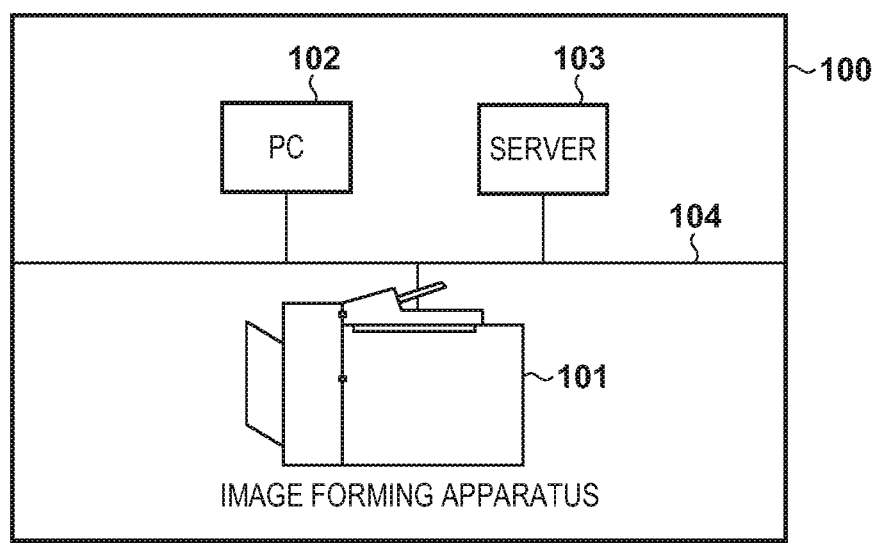
FIG. 1 shows an overall configuration of a system.

FIG. 1 is an overall system diagram for describing an overall configuration of an image forming system 100 including an image forming apparatus that operates an information processing apparatus according to an embodiment of the present invention. The present invention can be implemented either when the image forming apparatus is connected to a network, or under an environment where the image forming apparatus is not connected to the network. The present system, as a whole, is composed of a plurality of network devices including an image forming apparatus 101, a PC 102, and a server 103, as well as a LAN 104 to which the group of network devices is connected.

The image forming apparatus 101 is connected to the PC 102 and the server 103 via the network 104. The image forming apparatus 101 stops or locks a bundle when it receives a bundle stop instruction or a lock instruction from the PC 102 or the server 103, and when it receives a bundle stop instruction or a lock instruction from an operation unit 212 of the image forming apparatus 101, which will be described later. Furthermore, the image forming apparatus 101 unlocks a bundle when it receives an unlock instruction from the operation unit 212, or from the PC 102 or the server 103 via the network. Note that the PC 102 and the server 103 may be general-purpose devices, and are not limited to specific devices; therefore, the drawings of their hardware configurations and software configurations will be omitted. The PC 102 and the server 103 are, for example, general-purpose computers, and cause a CPU to execute a program stored in a memory (e.g., a RAM) to process data stored in the same RAM or perform input and output operations.

<Description of Diagram of Hardware Configuration of Image Forming Apparatus>

Figure 2:
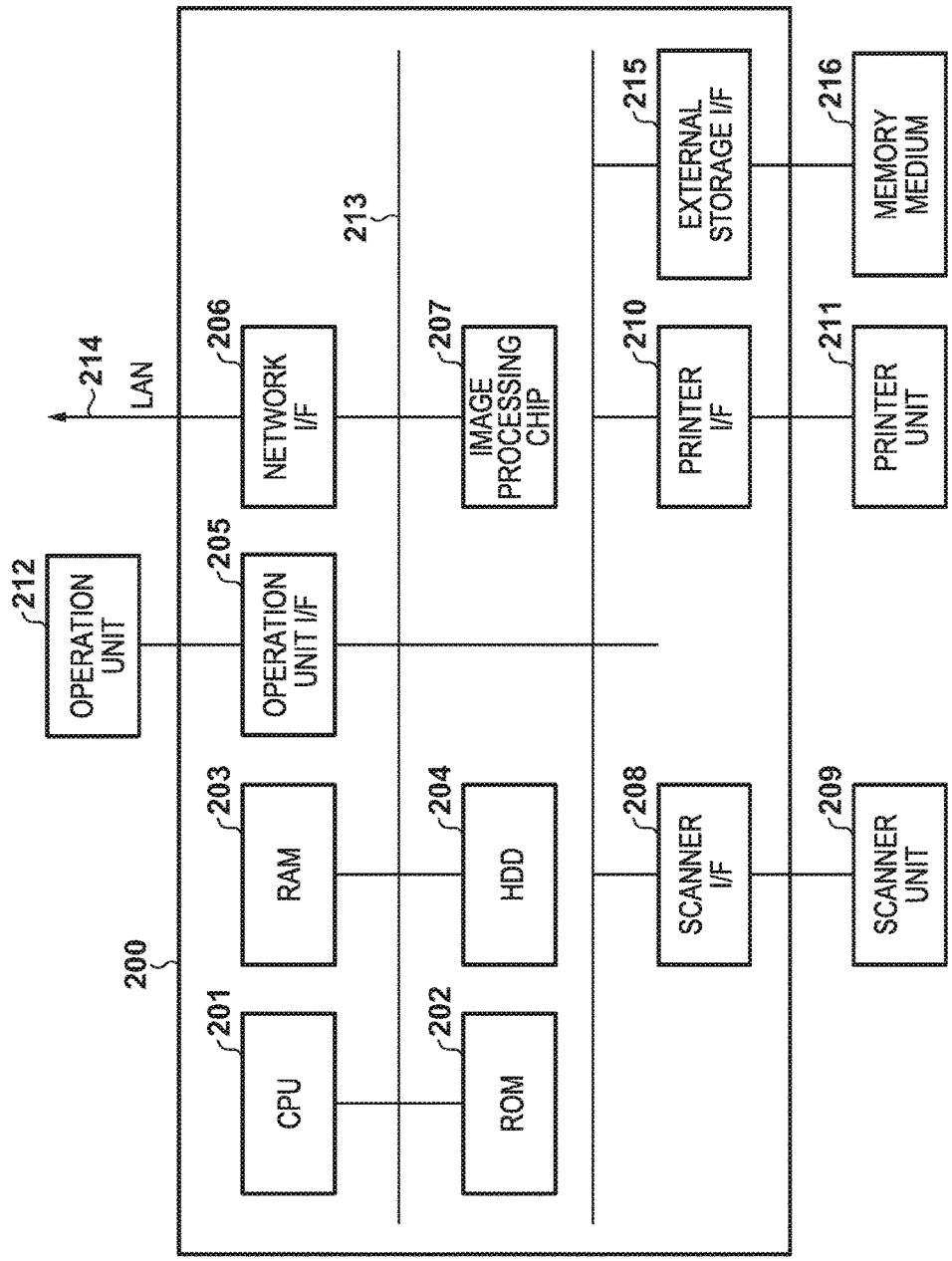
FIG. 2 shows a hardware configuration of an image forming apparatus.

Using FIG. 2, the following describes a configuration of the image forming apparatus 101 in the present system. A control unit 200, which includes a CPU 201, controls the image forming apparatus 101 integrally. The CPU 201 executes various types of control processing by reading out control programs stored in a ROM 202. The ROM 202 stores a boot program of the apparatus and the like. A RAM 203 is a system work memory that enables the CPU 201 to operate, and also serves as a memory for temporarily storing image data. This RAM 203 is composed of, for example, a non-volatile RAM that retains stored contents after the power-OFF, and a volatile RAM from which stored contents are deleted after the power-OFF. A hard disk drive (HDD) 204 stores image data, various types of programs, or various types of information tables.

An operation unit I/F 205 is an interface unit for establishing connection between a system bus 213 and the operation unit 212. This operation unit I/F 205 outputs image data to be displayed on the operation unit 212 to the system bus 213, and outputs information that has been input from the operation unit 212 to the system bus 213. The operation unit 212 is provided with a display unit (e.g., a liquid crystal display unit with a touchscreen function) and a keyboard.

A network I/F 206 is connected to a LAN 214 and the system bus 213, and handles input and output of information between the image forming apparatus 101 and the LAN 214. An image processing chip 207 applies correction, processing, and editing to image data that has been received from a scanner unit 209 via a scanner I/F 208. The scanner I/F 208 determines whether the received image data is a full-color original or a monochrome original, whether the received image data is an original containing text or an original containing a photograph, and so forth. The result of this determination is appended to the image data. Such appended information will be referred to as attribute data.

A printer I/F 210 receives image data transmitted from the image processing chip 207, and applies image processing to the image data with reference to attribute data appended to the image data. This image processing may be executed by the image processing chip 207. The image data after the image processing is transferred from the control unit 200 to a printer unit 211 via the printer I/F 210, and then printed onto a recording medium in the printer unit 211.

An external storage I/F 215 is connected to a memory medium 216, and is used in storing data and images in the apparatus to the memory medium 216, or in writing data in the memory medium 216 to the apparatus.

An application, that is to say, a bundle is installed in the HDD 204, and the CPU 201 can, for example, execute the installed bundle via a bundle execution environment or change the state of the bundle.

<Description of Drawing of Software Module Layers in System>

Figure 3:
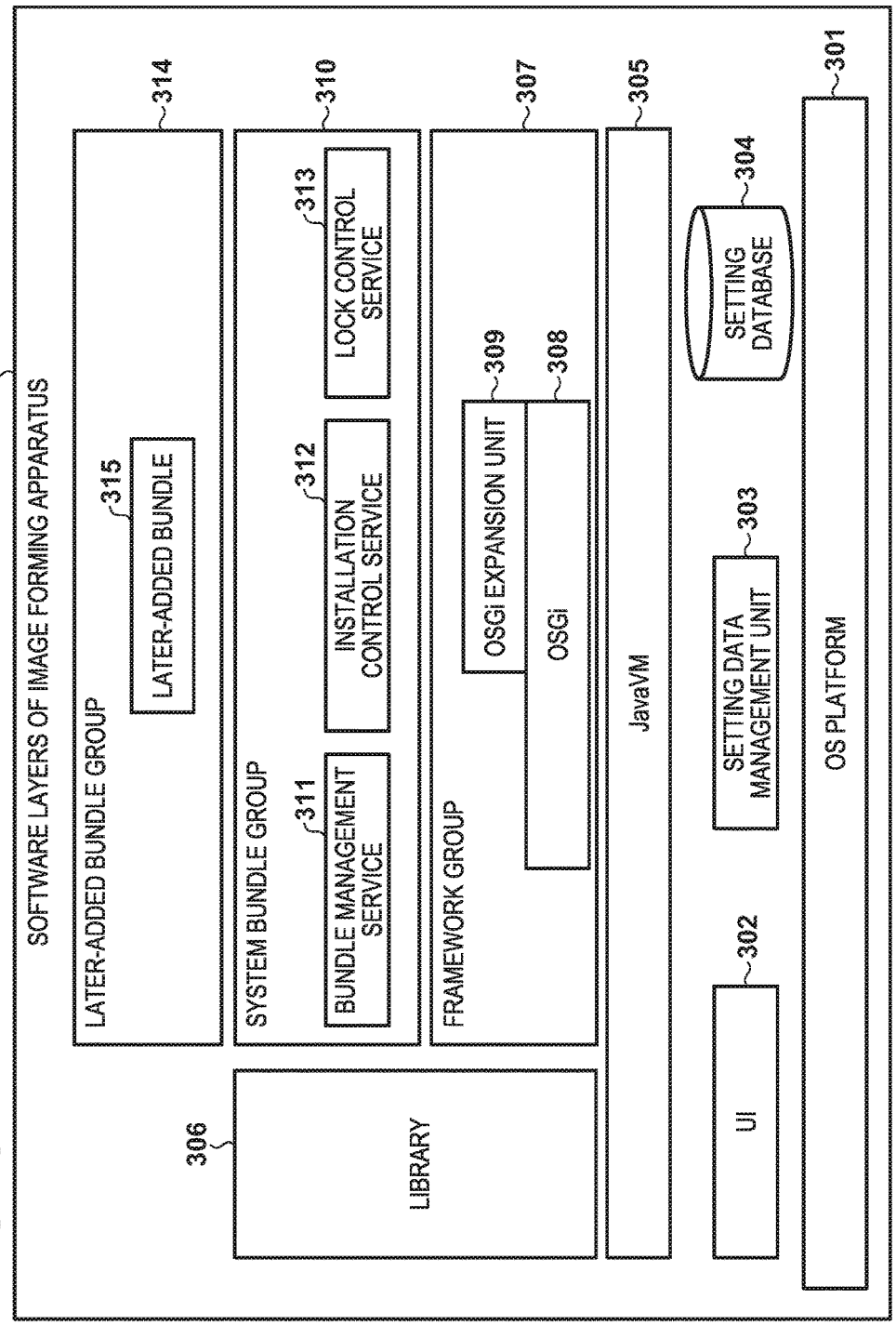
FIG. 3 shows software module layers in the image forming apparatus.

Using FIG. 3, the following describes software module layers of the image forming apparatus 101 according to the present embodiment. Note that each item of software shown in FIG. 3 and the subsequent figures is stored in the ROM 202 or the HDD 204, and executed by the CPU 201. Various types of information that are used during the execution are retained in the RAM 203 or the HDD 204, and exchanged between software functions. Communication is performed with an external device using the network I/F 206.

A description is now given of each item of software. Software has an operating system (OS) platform 301.

A UI 302 is a user interface module that serves mediation between the apparatus and a user operation when an operator performs various types of operations and settings with respect to the image forming apparatus 101. In accordance with an operation performed by the operator, this user interface module 302 transfers input information to various types of modules, which will be described later, and makes a request for processing or changes data settings, for example. This UI 302 may be realized by, for example, a web server. Using the web server enables a web browser installed in the PC 102 to, for example, act as a client to display a user interface screen, or perform necessary input.

A setting database 304 handles setting data of the image forming apparatus 101. A locked state management list, which will be described using FIG. 7, is retained in this setting database 304. This data is managed by a setting data management unit 303, and each bundle can be obtained by making an inquiry to the setting data management unit 303 about data values.

The Java's software platform is configured as a runtime environment for a Java VM 305, and is composed of the Java VM 305 serving as an interpreter, a library 306, and a framework group 307. The library 306 includes standard API libraries. The framework group 307 includes an OSGi 308, and the OSGi 308 causes a plurality of bundles to be operated on the single Java VM 305. Furthermore, an OSGi expansion unit 309 indicates that the functions can be expanded as necessary within a range that satisfies the specifications of the OSGi 308. The OSGi 308 and the OSGi expansion unit 309 provide, for example, functions of managing the life cycles of bundles and enabling inter-bundle communication.

A system bundle group 310 composed of a plurality of system bundles is provided above the OSGi 308. These system bundles are installed by the OSGi expansion unit 309 from a stored, undeployed program file group when there is no deployment destination folder at the time of initial activation, or when an update flag indicating the necessity of update is at a predetermined location. The undeployed program file group is, for example, firmware. This installation will be described with reference to FIG. 5.

There are different types of bundle groups: the system bundle group 310 that shipped after being installed during the manufacture of the image forming apparatus 101, and a later-added bundle group 314 that can be additionally installed and includes a later-added bundle 315 for realizing various types of functions. The system bundle group 310 includes a bundle management service 311 for managing a plurality of bundles and adding, updating, and deleting new bundles. The bundle management service 311 adds, updates, and deletes bundles using an installation control service 312. The later-added bundle 315 operates under control of the bundle management service 311. The bundle management service 311 stores, for example, bundle information containing the versions of bundles that have been added under control thereof, and license information.

The system bundle group 310 also includes a lock control service 313 for fixing the bundle state after installing the later-added bundle 315. Upon issuance of an instruction for updating or deleting a bundle, the bundle management service 311 determines whether the target bundle is in a locked state via the lock control service 313, and does not allow processing when the target bundle is in the locked state. The lock control service 313 also unlocks the later-added bundle 315 in the locked state. A bundle to be locked may be, but is not limited to, a non-free bundle that requires a fee to be used, for example. Identification information of a bundle may contain information indicating whether the bundle is non-free; in this way, whether the bundle is non-free can be determined based on the identification information of the bundle.

The later-added bundle 315 provides various types of processing to the user on the image forming apparatus 101. Examples of the later-added bundle 315 include a bundle that processes and compresses an image, and a bundle that manages printing restrictions and other divisions. The user can set, for example, user authentication information to be used by a bundle and display conditions of a UI displayed during the use of the bundle in accordance with an environment in which the user uses the bundle. Settings that have been customized by the user will be referred to as user data. The user data is stored to the setting database 304 via the setting data management unit 303. When the user data has been registered with the setting database 304 via the setting data management unit 303, the later-added bundle 315 can execute processing in accordance with the user data registered with the setting database 304.

Other examples of the later-added bundle 315 include a bundle that provides various types of processing to the user, and a bundle that controls a lock instruction to the lock control service 313 so as to lock the later-added bundle 315. Lock authorization is required to issue a lock instruction to the lock control service 313. In order for the later-added bundle 315 to issue a lock instruction, it needs to have a lock instruction permission. Upon receiving an instruction for locking a bundle from the server 103 or the PC 102, which is an external system for a sales company and the like, or from a UI displayed by the later-added bundle 315, the later-added bundle 315 designates the bundle to be locked, and issues a lock instruction to the lock control service 313. Although the later-added bundle 315 that has the lock instruction permission issues an instruction for locking a bundle to the lock control service 313 in the foregoing description, other elements, such as the system bundle group 310 and the library 306, may issue such an instruction.

<Description of Processing for Installing Later-Added Bundle>

Figure 4:
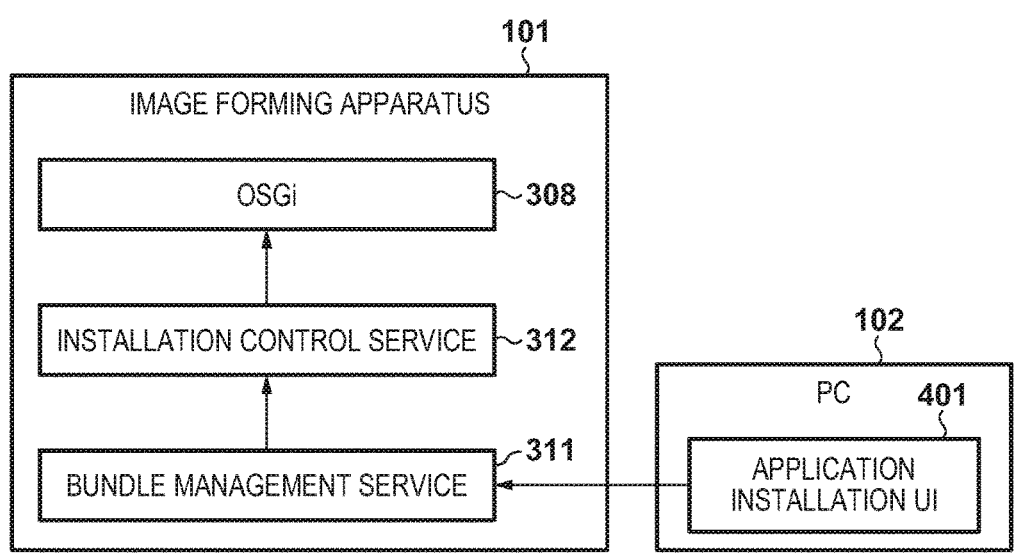
FIG. 4 is a block diagram showing a flow of installation of a bundle.

FIG. 4 is a block diagram showing a flow in which the user installs the later-added bundle 315 from the PC 102 to the image forming apparatus 101. In an example of FIG. 4, a web server is installed in the image forming apparatus 101, and a web browser is installed in the PC 102, but the illustration of these web browser and web server is omitted in FIG. 4.

An application installation UI 401 is displayed on the web browser of the PC 102, a bundle to be installed is designated via the application installation UI 401, and then the designated bundle is installed. To display the application installation UI 401, an HTTP request with a designation of a predetermined URL is transmitted from the web browser of the PC 102 to the web server of the image forming apparatus 101, and the web server reads out HTML data representing a UI from the designated storage location and returns the HTML data to the PC 102. In the present embodiment, it will be assumed that communication between the PC 102 and the image forming apparatus 101, which are respectively a client and a server, is performed based on HTTP, and therefore a description of a procedure related to HTTP will be omitted below.

Upon receiving the bundle designated via the application installation UI 401, the bundle management service 311 passes the bundle to the installation control service 312. Upon receiving the bundle file, the installation control service 312 requests the OSGi 308 to perform installation, and the OSGi 308 accordingly performs installation. The installed bundle is managed by the bundle management service 311.

<Description of Management of Bundle Data>

Figure 5:
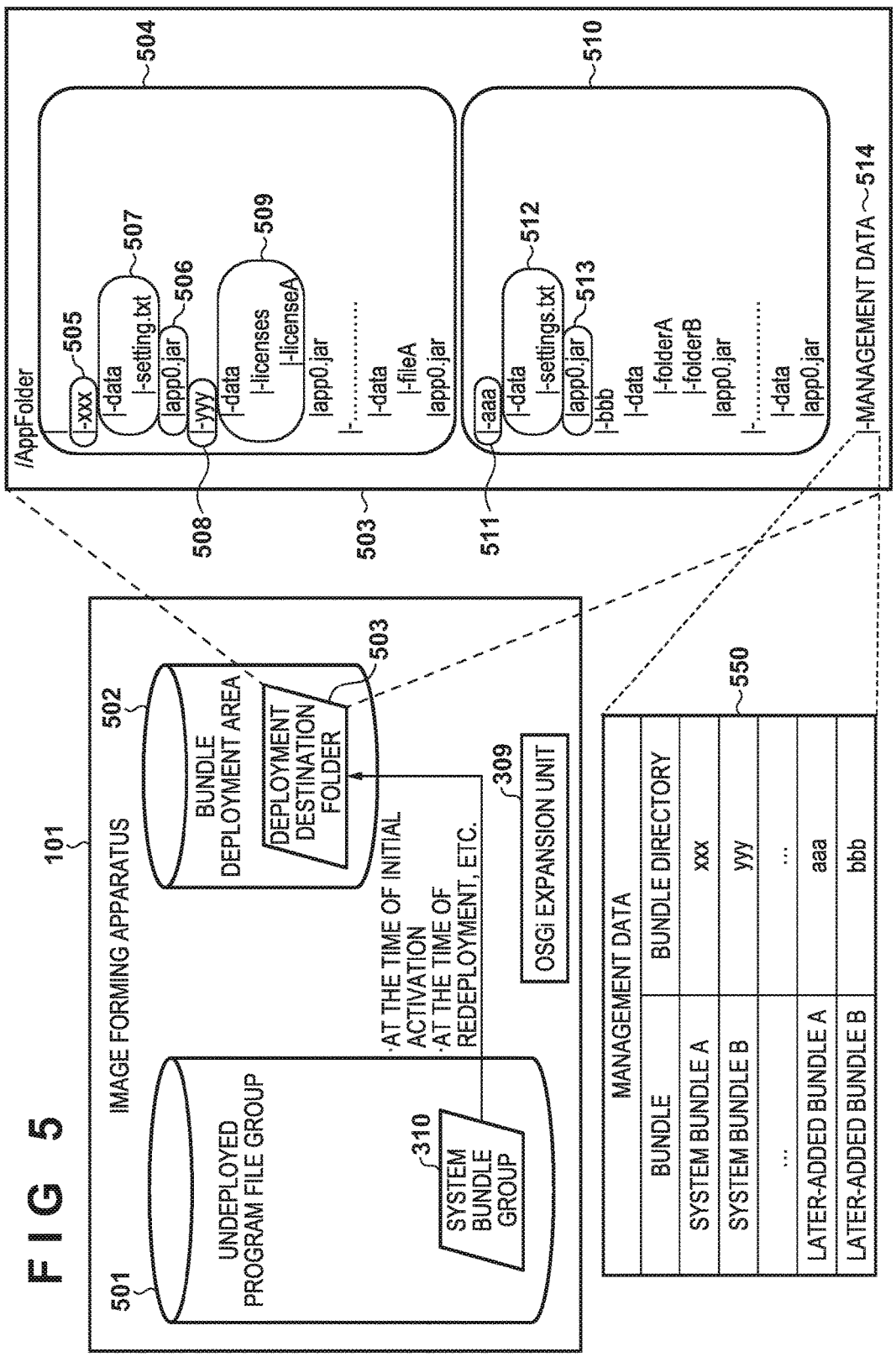
FIG. 5 is a block diagram showing installation of a bundle and a bundle deployment area serving as an installation destination.

FIG. 5 is a block diagram showing a flow in which the OSGi expansion unit 309 installs the system bundle group 310 from an undeployed program file group 501 to a bundle deployment area 502 in the image forming apparatus 101, and the bundle deployment area after the deployment.

The bundle deployment area 502 includes a deployment destination folder 503. This deployment destination folder 503 is generated by the OSGi expansion unit 309 at the time of normal initial activation or at the time of activation that immediately follows deletion of the deployment destination folder 503.

Upon detecting that the bundle deployment destination folder 503 does not exist or detecting that a system bundle group deployment destination 504 does not exist, the OSGi expansion unit 309 installs the system bundle group 310 stored in the undeployed program file group 501 in the deployment destination folder 503 inside the bundle deployment area 502.

An AppFolder, which is the deployment destination folder 503, will now be described. This folder has the system bundle group deployment destination 504 to which the system bundle group 310 included in the undeployed program file group 501 has been deployed, and a later-added bundle group deployment destination 510 to which the later-added bundle group 314 has been deployed.

The OSGi expansion unit 309 generates a folder for each installed bundle. Hereinafter, these folders will be referred to as bundle directories. Each bundle directory can be given a unique name generated based on, for example, the installation date and time. In the case of FIG. 5, a system bundle A is installed in a bundle directory xxx 505. In this bundle directory, the installed jar (i.e., Java archive) is placed with the name app0.jar 506. A data folder 507 for storing data of the bundle is also placed, and stores a setting.txt file of setting data of the system bundle A.

Furthermore, a system bundle B is installed in a bundle directory yyy 508. Similarly to the system bundle A, the installed jar is placed with the name app0.jar. In addition, bundle license data retained by the system bundle B is stored in or below a licenses folder in or below a data folder 509. Specifically, a licenseA file representing the license of the system bundle B is stored.

Meanwhile, as indicated by the later-added bundle group deployment destination 510, a later-added bundle that is installed by the user later in the method shown in FIG. 4 is also installed according to a directory structure similar to that of the system bundle group deployment destination 504.

FIG. 5 shows that a later-added bundle C is installed in a bundle directory aaa 511. Similarly to system bundles, the installed jar is placed with the name app0.jar 513. Furthermore, a data folder 512 for storing data of the bundle is placed, and stores a settings.txt file of user data, which is setting data used when the bundle C operates. When the bundle installed in the bundle directory aaa 511 is uninstalled, the whole directory aaa 511 is deleted, and the user data stored in the data folder 512 is also deleted.

The deployment destination folder 503 also has management data 514 for managing the foregoing installed information in addition to the system bundle group deployment destination 504 and the later-added bundle group deployment destination 510. Data of a table 550 that manages a correspondence between bundles and bundle directories is retained as the management data 514. In this way, when a bundle is identified, the corresponding bundle directory can be known. The deployment destination folder 503 further retains locked state management data, which will be described later with reference to FIGS. 7, 11, and 15. State management data indicates the states of bundles, and indicates at least a locked state.

<Description of Transition in State of Later-Added Bundle>

Figure 6:
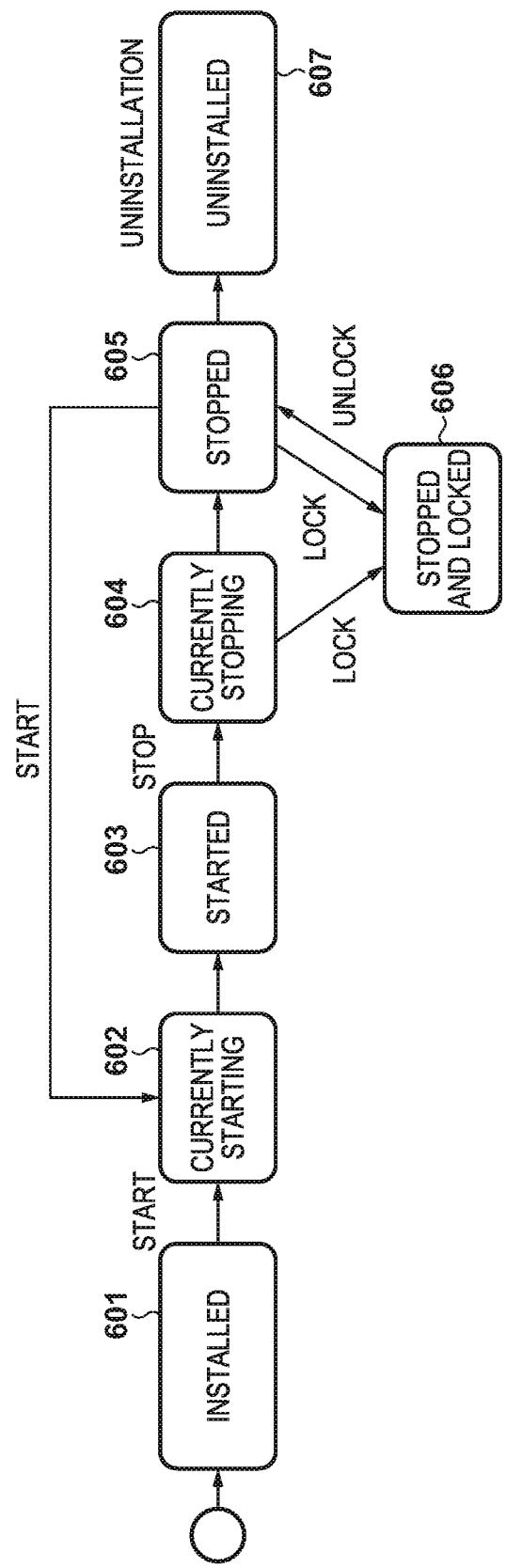
FIG. 6 is a state transition diagram showing a flow from installation to uninstallation of a bundle and a flow to a stopped and locked state.

FIG. 6 shows a state transition from installation to uninstallation of a later-added bundle. When the later-added bundle 315 has been installed via, for example, the application installation UI 401 of the PC 102, its state turns into installed 601. When the installed later-added bundle 315 does not exist in the image forming apparatus 101, a directory of the later-added bundle 315 to be installed is generated in the later-added bundle group deployment destination 510, and setting data is deployed to the same directory at the same time as installation of the later-added bundle 315, as shown in FIG. 5. When the user has issued an instruction for starting the execution of the installed later-added bundle 315, the bundle enters a started state 603 via currently starting 602. The started state 603 denotes a state in which the bundle is in operation. When the user has issued an instruction for stopping the later-added bundle in the started state 603, the bundle makes a transition to a stopped state 605 via currently stopping 604. To place the later-added bundle 315 into a locked state, an instruction source must have lock authorization. To place the later-added bundle 315 into the locked state, a module that has lock authorization issues a lock instruction after issuing a stop instruction to the later-added bundle 315. When the later-added bundle 315 is currently stopping 604 or in the stopped state 605, it can make a transition to a stopped and locked state 606 in response to the lock instruction. When the later-added bundle 315 is in the stopped and locked state 606, it remains in the stopped and locked state 606 until it is unlocked by a module that has unlock authorization. That is to say, when the later-added bundle 315 is in the stopped and locked state 606, it does not make a transition to the started state 603 via currently starting 602 and remains in the stopped and locked state 606 in response to the user's start instruction. In order for the bundle to make a transition from the stopped and locked state 606, a module that has lock authorization and unlock authorization needs to issue an unlock instruction; the bundle returns to the stopped state 605 in response to the unlock instruction. The user can issue a start instruction and an uninstallation instruction to the later-added bundle 315 in the stopped state 605. When the uninstallation instruction has been issued to the later-added bundle 315, the bundle enters an uninstalled state 607 in response to the uninstallation instruction, and the later-added bundle 315 itself and corresponding setting data are deleted, together with the folders in which they were installed, from the bundle deployment area 503 of the image forming apparatus 101. On the other hand, when the bundle state is the stopped and locked state 606, uninstallation is not performed and the bundle does not make a transition to the uninstalled state 607 in response to the uninstallation instruction. The states shown in FIG. 6 may be retained and managed by, for example, system bundles, such as the installation control service 312. These bundle states are retained and managed while being accessible from bundles. Among these states, especially the stopped state and the stopped and locked state are managed as state management data shown in FIG. 7.

<Description of Management of Locked State>

FIG. 7 shows a management table (or state management data) that manages whether bundles in a stopped state are in a locked state or in a non-locked state. This table manages each bundle in the stopped state in association with the locked state or the non-locked state. In an example of FIG. 7, App1 is in the stopped and locked state. App2 is in the stopped state but is not locked; therefore, the start instruction and the uninstallation instruction can be issued thereto. App3 is in the stopped and locked state; therefore, its state is not allowed to make a transition in response to the start instruction and the uninstallation instruction. The foregoing information, that is to say, state management data is registered with the setting database 304 and managed by the lock control service 313.

<Flowchart Executed when Lock Instruction is Issued to Bundle>

Figure 8:
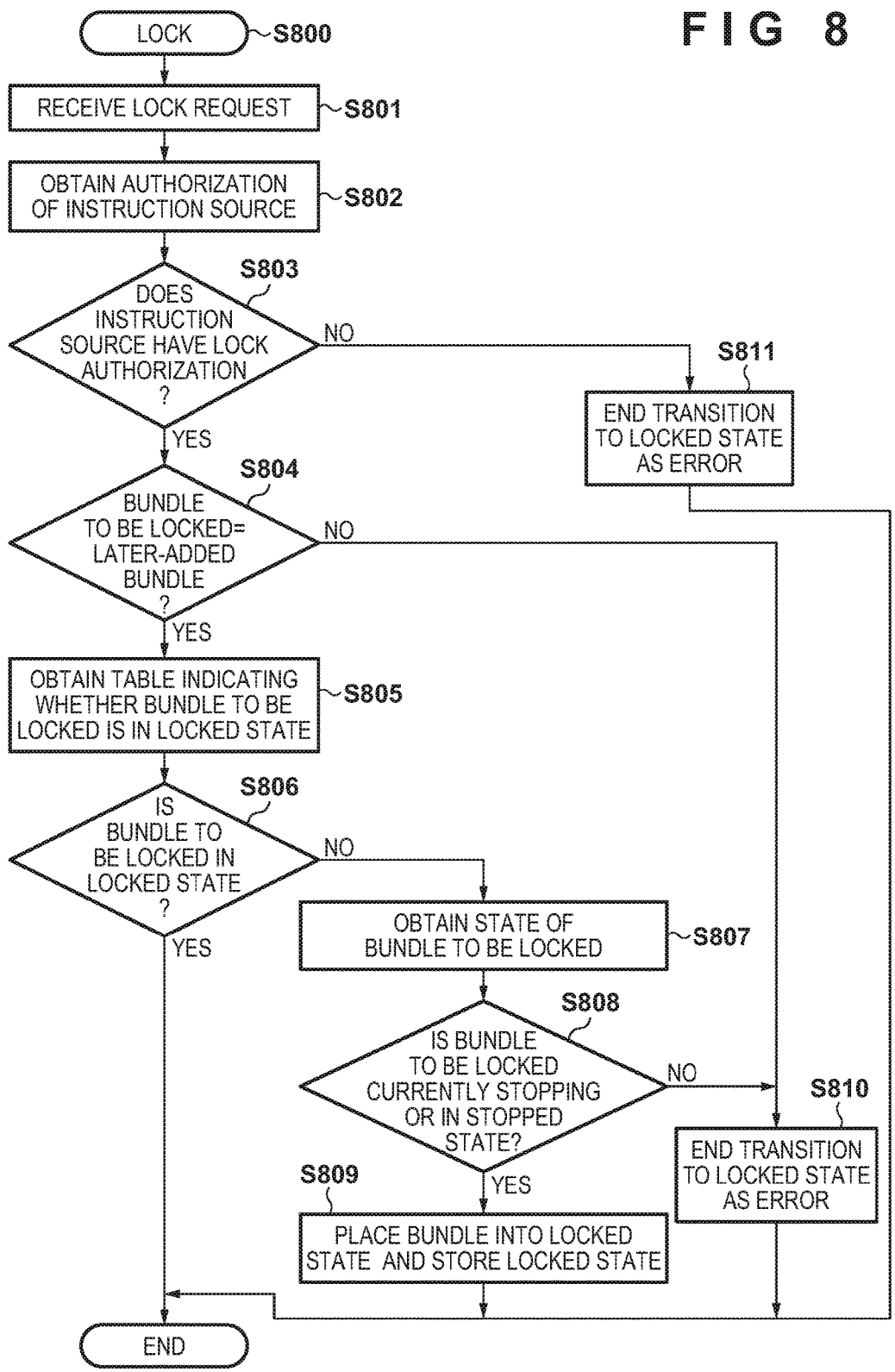
FIG. 8 is a flowchart for locking a bundle in a stopped state.

Using FIG. 8, the following describes a flow of processing executed when a lock instruction is issued to a bundle. A procedure of FIG. 8 is executed by the lock control service 313 and the CPU 201, which are software and hardware, respectively. The lock control service 313 receives a lock instruction to a specific bundle (step S801). An instruction source is, for example, the UI 302 or the later-added bundle 315, and the lock instruction contains information that specifies the instruction source and information that specifies the target bundle. Next, the lock control service 313 obtains authorization of the instruction source that issued the lock instruction (step S802). The lock control service 313 determines whether the authorization of the instruction source obtained in step S802 includes authorization to issue the lock instruction (step S803). If the instruction source does not have the authorization to issue the lock instruction, the processing is ended as an error without placing the bundle into the locked state (step S811). In this case, for example, an error indicating that the instruction source does not have the authorization is returned to the instruction source.

If it is determined that the instruction source has the authorization to issue the lock instruction in step S803, the lock control service 313 determines whether the bundle to be locked is a later-added bundle via the installation control service 312 (step S804). If the bundle to be locked is not the later-added bundle, it is one of the system bundle group 310, and thus the processing is ended as an error without allowing the bundle to make a transition to the locked state (step S810).

If it is determined that the bundle to be locked is the later-added bundle in step S804, the lock control service 313 obtains the management table indicating whether the bundle to be locked is already in the locked state (FIG. 7) from the setting database 304 via the setting data management unit 303 (step S805). Next, in step S805, whether the bundle to be locked has already been locked is determined based on the obtained management table (step S806). If it is determined that the bundle to be locked has already been locked in step S806, the present flowchart is ended without executing anything. In this case, a response indicating that the bundle to be locked has already been locked may be returned to the instruction source. If it is determined that the bundle to be locked is not in the locked state in step S806, the lock control service 313 obtains a state of the bundle to be locked via the installation control service 312 (step S807). Next, whether the state of the bundle to be locked obtained in step S807 is currently stopping, the stopped state, or something else is determined (step S808). If it is determined that the bundle to be locked is currently stopping or in the stopped state in step S808, the bundle is placed into the locked state, and the current state of the bundle, namely the locked state is recorded to the setting database 304 via the setting data management unit 303 (step S809). Note that placing the bundle into the locked state may be recording of information indicating the stopped and locked state as the state of the target bundle in state management data. If the bundle is locked during the currently stopping state, the bundle operates until it enters the stopped state, and stops operating upon entering the stopped state. Therefore, it enters the stopped and locked state as in the case in which it is locked during the stopped state. If it is determined that the bundle to be locked is not currently stopping or in the stopped state in step S808, the processing is ended as an error without allowing the bundle to make a transition to the locked state (step S810). In this case, a response indicating that the bundle cannot be locked may be returned to the instruction source.

Through the foregoing procedure, if the target bundle is in a predetermined state, for example, the stopped state or the currently stopping state, the target bundle is locked in response to a lock instruction from an instruction source that has authorization to lock the target bundle. The target bundle is not locked if the instruction source does not have necessary authorization or the target bundle is not currently stopping or in the stopped state. Note that the determination about the authorization can be made with reference to authorization information by transmitting identification information of the instruction source to an authorization management server, for example. When there is no authorization management server, the determination can be made with reference to, for example, a table that has recorded therein lock authorization in association with identification information of each individual bundle or user.

<Flowchart Executed when Unlock Instruction is Issued to Bundle>

Figure 9:
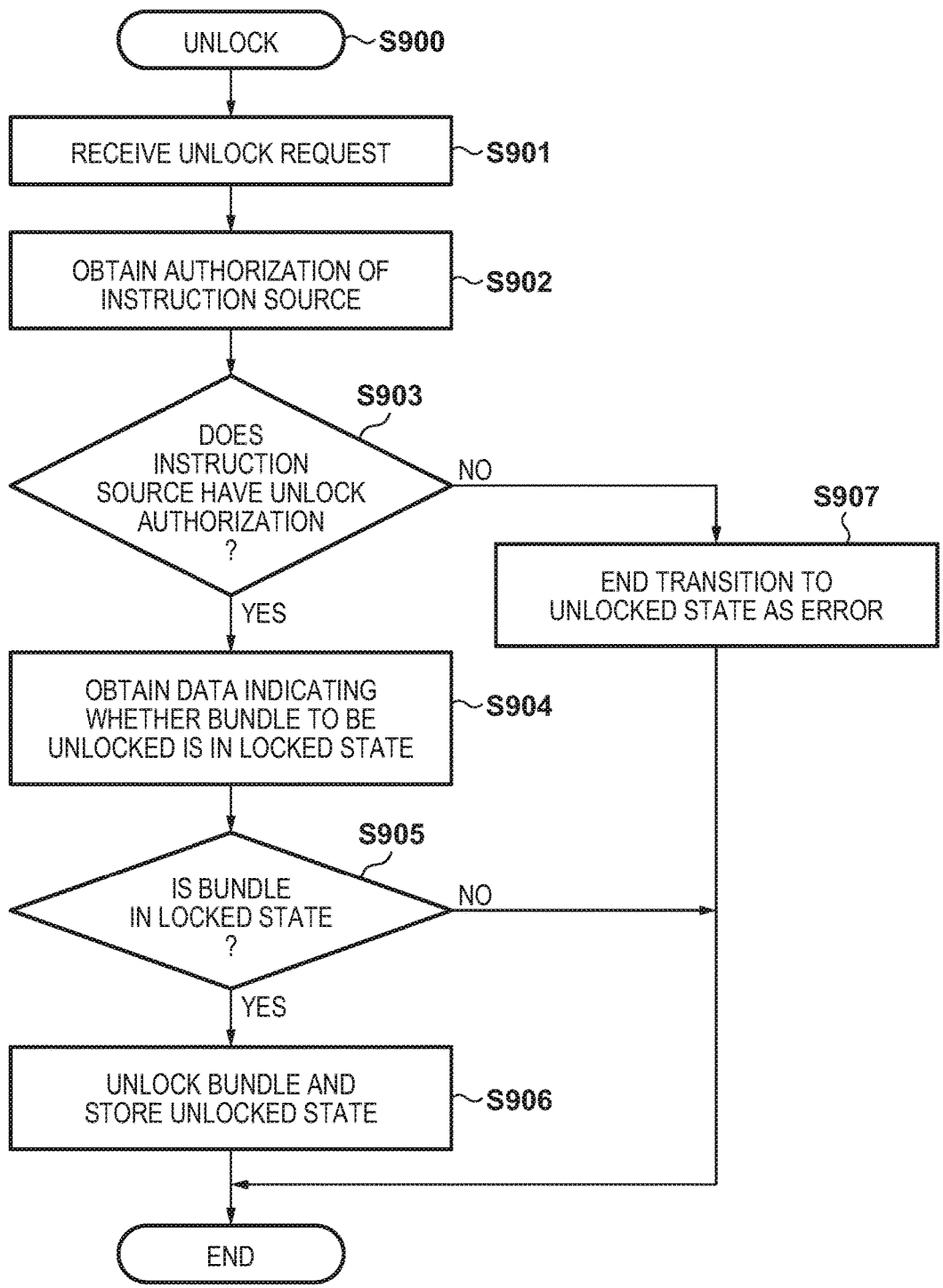
FIG. 9 is a flowchart for unlocking a locked bundle.

Using FIG. 9, the following describes a flow of processing for unlocking a bundle in the locked state. A procedure of FIG. 9 is also executed by the lock control service 313 and the CPU 201, which are software and hardware, respectively. The lock control service 313 receives an unlock instruction to a specific bundle (step S901). The unlock instruction contains information that specifies an instruction source and information that specifies the target bundle. Next, the lock control service 313 obtains authorization of the instruction source that issued the unlock instruction (step S902). The lock control service 313 determines whether the authorization obtained in step S902 includes unlock authorization (step S903). This determination may be made in the same manner as the determination about the authorization in the procedure of FIG. 8. If it is determined that the authorization of the instruction source does not include the unlock authorization in step S903, the processing is ended as an error without unlocking and allowing the transition to the stopped state (step S907).

If it is determined that the authorization of the instruction source includes the unlock authorization in step S903, the lock control service 313 obtains state management data indicating whether the bundle to be unlocked is in the locked state from the setting database 304 via the setting data management unit 303 (step S904). The lock control service 313 determines whether the bundle to be unlocked is in the locked state based on the information obtained in step S904 (step S905). If it is determined that the bundle to be unlocked is not in the locked state in step S905, the present flowchart is ended without executing anything. If it is determined that the bundle to be unlocked is in the locked state in step S905, the lock control service 313 causes the bundle to be unlocked to make a transition from the stopped and locked state to the stopped state, and records the current state of the bundle, namely the stopped state to the setting database 304 via the setting data management unit 303 (step S906).

Through the foregoing procedure, if the target bundle is in the locked state, the target bundle in the locked state is unlocked in response to an unlock instruction from an instruction source that has authorization to unlock the target bundle. The locked state of the target bundle is not cancelled if the instruction source does not have necessary authorization or the target bundle is not in the locked state.

<Flowchart Executed when Instruction for Changing Bundle State is Issued Via Application Installation UI>

Figure 10:
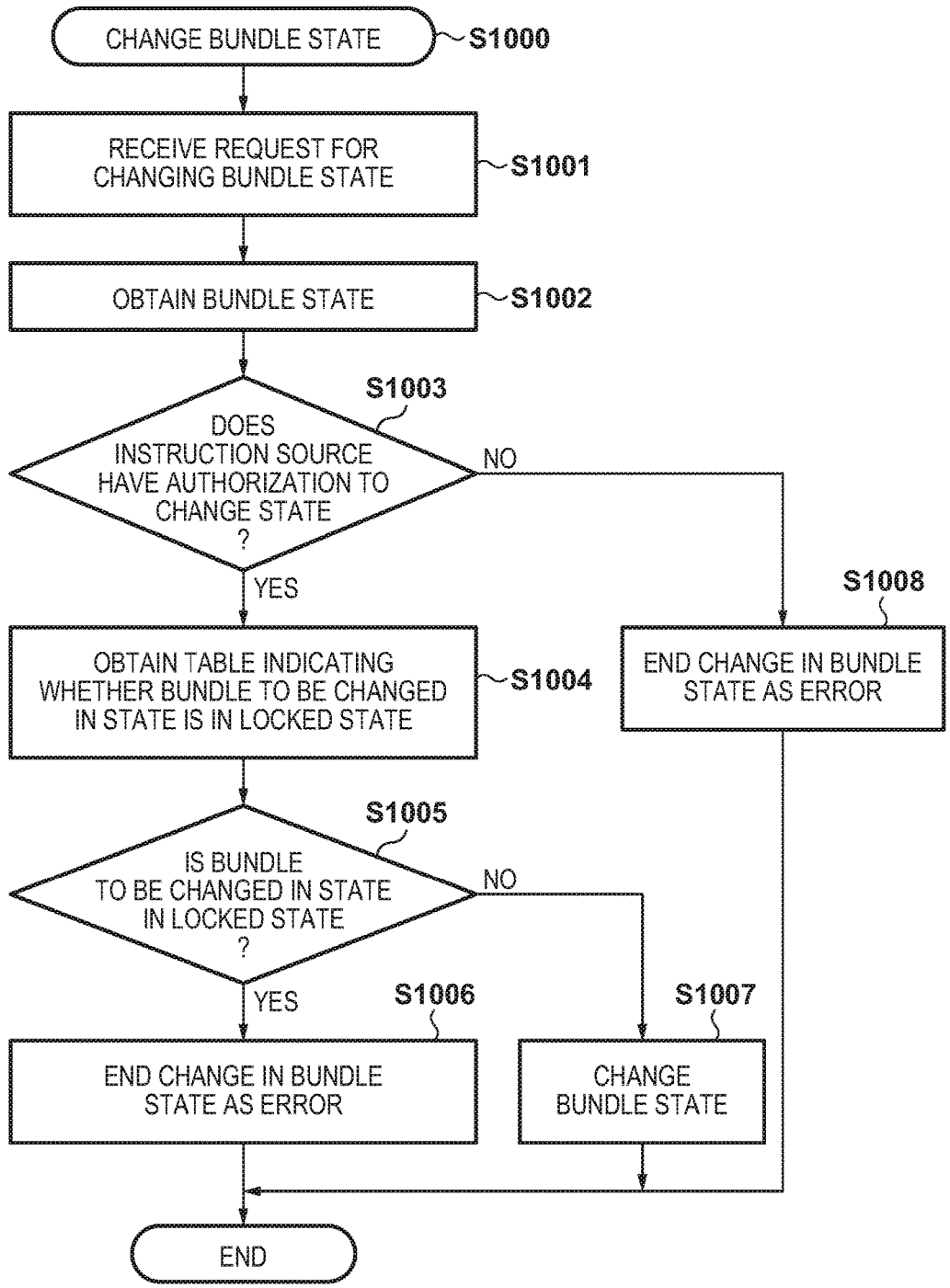
FIG. 10 is a flowchart for changing a bundle state.

Using FIG. 10, the following describes a flow of processing executed when the user has issued an instruction for changing a bundle state, for example, an instruction for stopping, starting, updating, or uninstalling a bundle, using the application installation UI and the like. A procedure of FIG. 10 is executed by the bundle management service 311 and the CPU 201, which are software and hardware, respectively.

The bundle management service 311 receives an instruction related to a change in a bundle state from the UI 302 that can be used by the user, such as the application installation UI 401 (step S1001). This instruction contains, for example, information that specifies an instruction source, information that specifies a target bundle, and information indicating a post-change state. The bundle management service 311 obtains a current state of a bundle to be changed in state via the installation control service 312 (step S1002). Next, the bundle management service 311 obtains authorization of the instruction source that issued the instruction for changing the bundle state, and determines whether the instruction source has authorization to change the state (step S1003). If it is determined that the instruction source does not have the authorization to change the state in step S1003, the processing is ended as an error without allowing the change in the bundle state (step S1008). If it is determined that the instruction source has the authorization to change the state in step S1003, the bundle management service 311 obtains information indicating whether the bundle to be changed in state is in the locked state or the non-locked state, that is to say, the management table, via the lock control service 313 (step S1004). The bundle management service 311 determines whether the bundle to be changed in state is in the locked state or the non-locked state based on the information obtained in step S1004 (step S1005). If it is determined that the bundle to be changed in state is in the locked state in step S1005, the bundle management service 311 ends the state change as an error because the change in the bundle state is not allowed (step S1006). Specifically, the state change is ended as an error if the start, stop, update, or uninstallation instruction has been issued to the bundle in the locked state. In this case, a response indicating that the state change has been ended as an error may be returned to the instruction source.

On the other hand, if it is determined that the bundle to be changed in state is in the non-locked state in step S1005, the bundle management service 311 allows the change in the state of the designated bundle, and instructs the installation control service 312 to change the state as instructed by the instruction source (step S1007). For example, when the instruction source has issued an instruction to start the target bundle, the bundle management service 311 starts the target bundle via the installation control service 312 if the target bundle is in the stopped state.

Implementing the present embodiment enables a sales company and the like to issue a lock instruction to a bundle that should not be used by the user after the bundle is stopped; this makes it possible to prevent the bundle from being used via a user operation. Furthermore, when the sales company and the like allow the user to use the bundle again, unlocking the bundle will enable the user to use the functions of the bundle under the settings and environment that were used before. In this way, the need to uninstall the bundle for the purpose of suspending the use of the bundle is eliminated, and the use of the bundle can be restarted using the user data that has been left.

<Second Embodiment>

The following describes another embodiment of the present invention. The first embodiment has introduced an example in which a bundle makes a transition to the locked state or the non-locked state in response to a request from an instruction source that has authorization to issue a lock instruction and an unlock instruction to the bundle. However, when there are a plurality of instruction sources that have authorization to issue a lock instruction and an unlock instruction, the following problem arises: after a system for a sales company and the like has stopped a bundle that should not be used and issued a lock instruction thereto, the bundle can be made usable by unlocking the bundle in response to an unlock request from a system for an entity other than the sales company as long as the latter system has authorization. To solve this problem, the present embodiment presents a method for storing a module that has issued a lock instruction to a bundle, and determines whether the module that has issued the lock instruction matches a module that has issued an unlock instruction when the bundle is unlocked.

<Description of Example in which Locked State of Stopped Bundle and Instruction Source that has Issued Lock Instruction are Managed>

FIG. 11 shows a management table that manages instruction sources that issued a lock instruction to bundles in the locked state, in contrast to the management table according to the first embodiment (FIG. 7) that manages whether stopped bundles are in the locked state or the non-locked state. Each bundle in the stopped and locked state is managed in association with identification information indicating an instruction source that issued a lock instruction thereto. In an example of FIG. 11, App1 is in the stopped and locked state, and a module managed with the identifier "00000000-0000-0000-0000-000000000001" has issued a lock instruction thereto. App2 is in the stopped state but is not locked; therefore, it can make a transition to the started state, or can be uninstalled. App3 is in the stopped and locked state; therefore, its state is not allowed to make a transition in response to a start instruction and an uninstallation instruction. A module managed with the identifier "00000000-0000-0000-0000-000000000002" has issued a lock instruction thereto.

Different instruction sources have issued a lock instruction to App1 and App3. For example, even if the module with the identifier "00000000-0000-0000-0000-000000000001" has issued an unlock instruction to App3, unlocking is not allowed because this instruction source is different from the module that has issued the lock instruction thereto.

<Flowchart for Determining Instruction Source to Lock Bundle>

Figure 12:
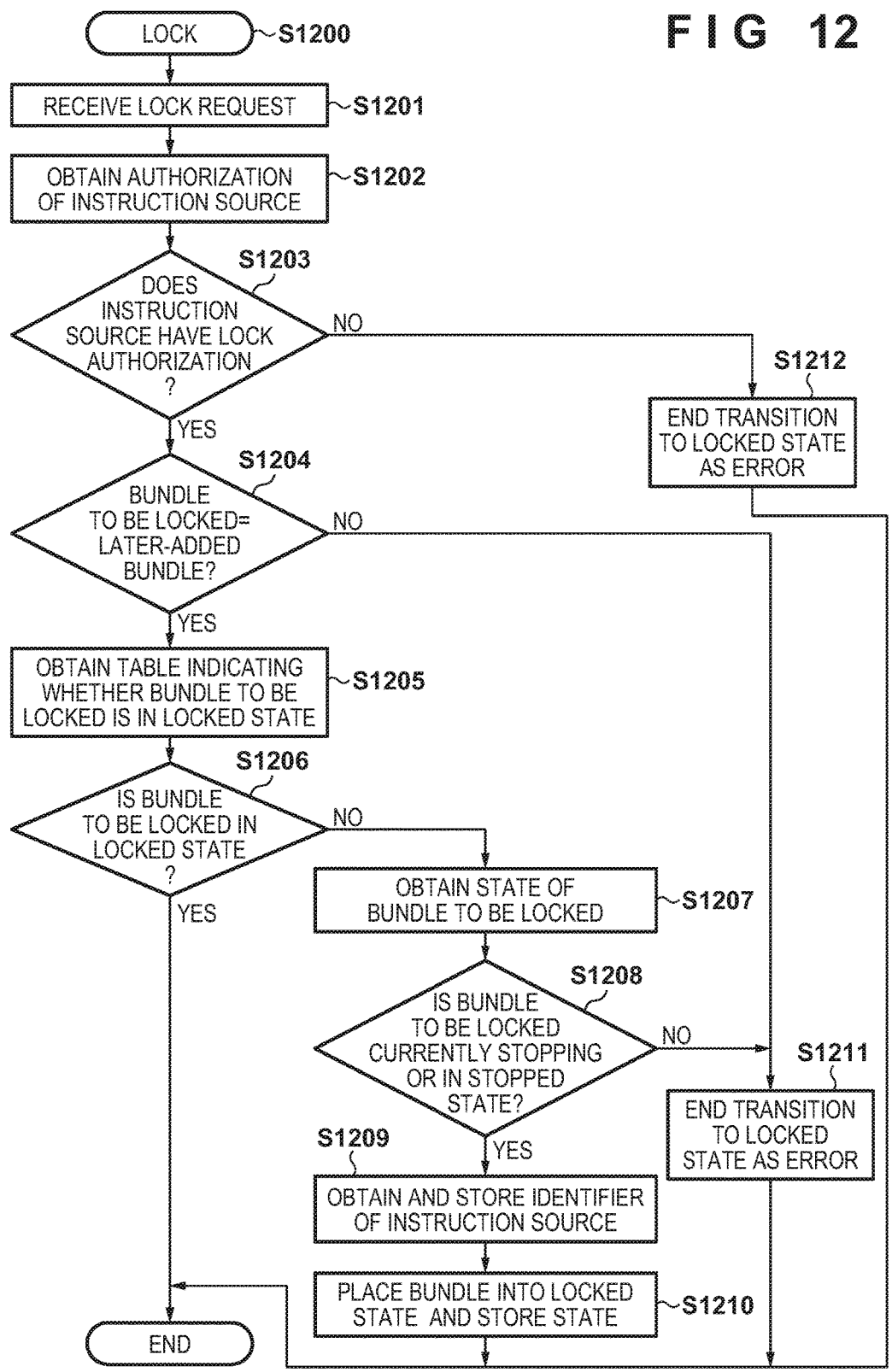
FIG. 12 is a flowchart for determining an instruction source in locking a bundle.

Using FIG. 12, the following describes a flow for determining a lock instruction source when a lock instruction has been issued to a bundle. A procedure of FIG. 12 is executed by the lock control service 313 and the CPU 201, which are software and hardware, respectively, as in the case of FIG. 8.

The lock control service 313 receives a lock instruction to a specific bundle (step S1201). This lock instruction contains identification information of an instruction source and identification information of the bundle to be locked. Next, the lock control service 313 obtains authorization of the instruction source that issued the lock instruction (step S1202). The authorization of the instruction source may be obtained in the same manner as in FIG. 8, for example. The lock control service 313 determines whether the authorization obtained in step S1202 includes authorization to issue a lock instruction (step S1203). If the instruction source does not have the authorization to issue the lock instruction, the processing is ended as an error without placing the bundle into the locked state (step S1212).

If it is determined that the instruction source has lock authorization in step S1203, the lock control service 313 determines whether the bundle to be locked is the later-added bundle 315 via the installation control service 312 (step S1204). If the bundle to be locked is not the later-added bundle 315, it is one of the system bundle group 310, and thus the processing is ended as an error without allowing the bundle to make a transition to the locked state (step S1211).

If it is determined that the bundle to be locked is the later-added bundle in step S1204, the lock control service 313 obtains the management table indicating whether the bundle to be locked is already in the locked state (FIG. 11) from the setting database 304 via the setting data management unit 303 (step S1205). Next, based on the management table obtained in step S1205, whether the bundle to be locked has already been locked is determined (step S1206).

If it is determined that the bundle to be locked has already been locked in step S1206, the present flowchart is ended without executing anything. If it is determined that the bundle to be locked is not in the locked state in step S1206, the lock control service 313 obtains a state of the bundle to be locked via the installation control service 312 (step S1207). Next, whether the state of the bundle to be locked obtained in step S1207 is currently stopping or the stopped state is determined (step S1208). If it is determined that the bundle to be locked is currently stopping or in the stopped state in step S1208, the lock control service 313 obtains an identifier of the instruction source, and registers the identifier as the instruction source of the lock instruction to the bundle with the setting database 304 via the setting data management unit 303 (step S1209). Next, the lock control service 313 changes the state of the bundle to the locked state, and records the current state of the bundle, namely the locked state to the management table of the setting database 304 via the setting data management unit 303 (step S1210). If it is determined that the bundle to be locked is not currently stopping or in the stopped state in step S1208, the processing is ended as an error without allowing the bundle to make a transition to the locked state (step S1211).

<Flowchart for Determining Instruction Source to Unlock Bundle>

Figure 13:
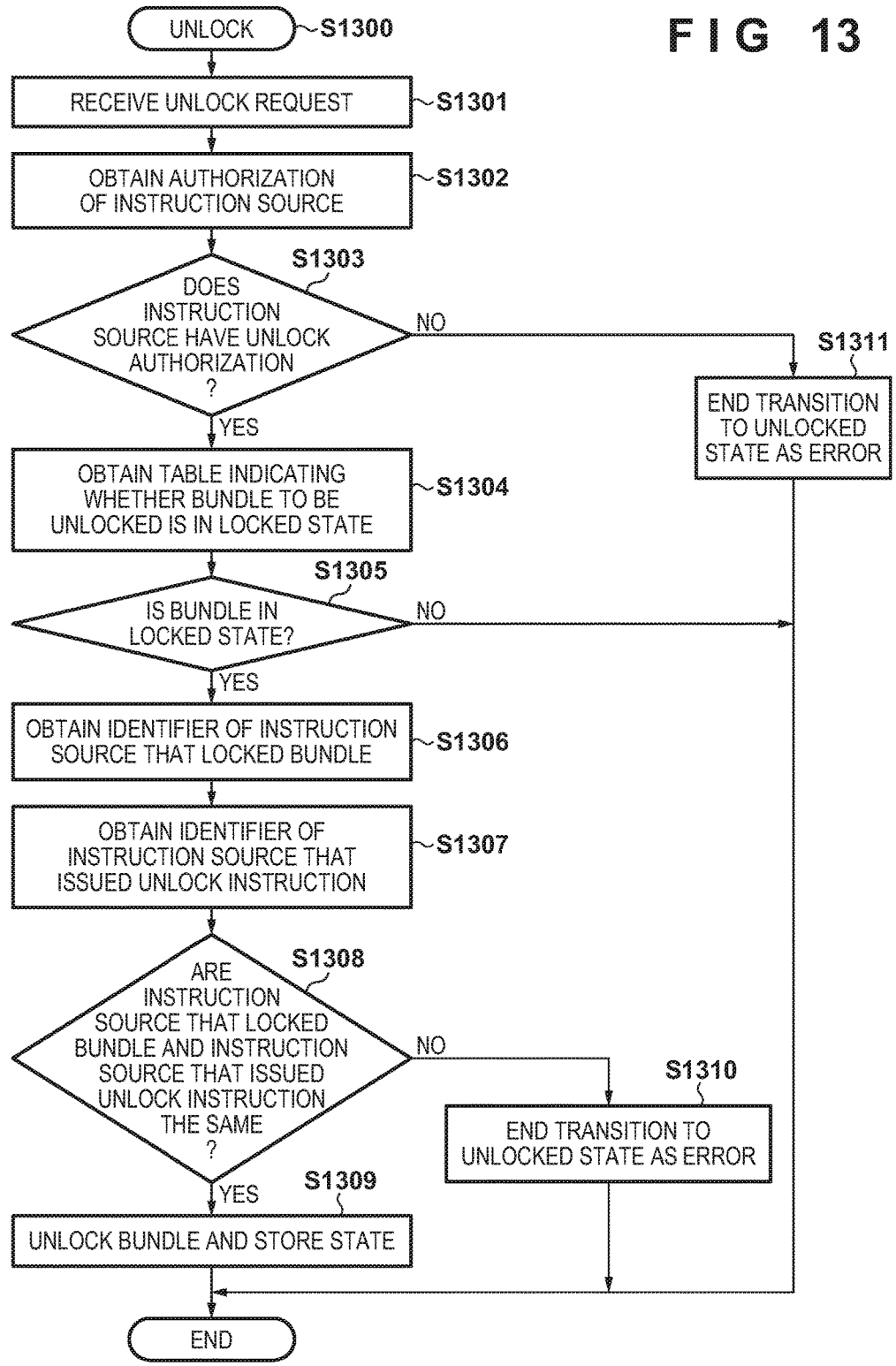
FIG. 13 is a flowchart for unlocking a bundle in accordance with an instruction source.

Using FIG. 13, the following describes a flow of processing for determining an instruction source that issued a lock instruction and an instruction source that issued an unlock instruction to unlock a bundle. A procedure of FIG. 13 is executed by the lock control service 313 and the CPU 201, which are software and hardware, respectively, as in the case of FIG. 12.

The lock control service 313 receives an unlock instruction to a specific bundle (step S1301). The unlock instruction contains, for example, identification information of the target bundle and identification information of an instruction source. Next, the lock control service 313 obtains authorization of the instruction source that issued the unlock instruction (step S1302). This is similar to step S1202 of FIG. 12. The lock control service 313 determines whether the authorization obtained in step S1302 includes unlock authorization (step S1303). If it is determined that the authorization of the instruction source does not include the unlock authorization in step S1303, the processing is ended as an error without unlocking and allowing the transition to the stopped state (step S1311).

If it is determined that the authorization of the instruction source includes the unlock authorization in step S1303, the lock control service 313 obtains the management table indicating whether the bundle to be unlocked is in the locked state (FIG. 11) from the setting database 304 via the setting data management unit 303 (step S1304). The lock control service 313 determines whether the bundle to be unlocked is in the locked state based on the management table obtained in step S1304 (step S1305). In other words, whether the state corresponding to the identification information of the target bundle is the locked state (stopped and locked state) is determined. If it is determined that the bundle to be unlocked is not in the locked state in step S1305, the present flowchart is ended without executing anything. If it is determined that the bundle to be unlocked is in the locked state in step S1305, the lock control service 313 obtains the management table containing an identifier of an instruction source that locked the target bundle from the setting database 304 via the setting data management unit 303 (step S1306). Note that if the management table has been obtained in step S1304, step S1306 may be skipped. Next, the lock control service 313 obtains an identifier of the instruction source that issued the unlock instruction in step S1301 (step S1307). The lock control service 313 determines whether the identifier of the instruction source that locked the bundle, which was obtained in step S1306, and the identifier of the instruction source that issued the unlock instruction, which was obtained in step S1307, are the same (step S1308). If it is determined that the identifiers are the same in step S1308, it means that the issuer of the lock instruction and the issuer of the unlock instruction to the target bundle are the same, and thus the lock control service 313 unlocks the bundle and registers the current state, namely the non-locked state with the management table of the setting database 304 via the setting data management unit 303 (step S1309). If it is determined that the identifiers are not the same in step S1308, it means that the lock instruction and the unlock instruction to the bundle were received from different instruction sources, and thus the transition to the unlocked state is ended as an error (step S1310).

Implementing the present embodiment disables unlocking of a bundle in the stopped and locked state when the issuer of the lock instruction to the bundle and the issuer of the unlock instruction to the bundle are not the same. Therefore, when a sales company and the like have suspended the use of a bundle that should not be used, another system cannot bring the bundle to a reusable state; this makes it possible to prevent human errors whereby the bundle is mistakenly restarted by another system, and prevent the bundle from being reused intentionally.

<Third Embodiment>

The following describes still another embodiment of the present invention. The first embodiment and the second embodiment have introduced an exemplary use case in which a transition is made to the stopped and locked state so as to prevent the later-added bundle 315 from being used via a user operation. However, by making use of a lock function, it is possible to not only prevent a user from using the later-added bundle 315, but also enable the user to use the bundle without fail (the use of the bundle cannot be suspended by the user). The present embodiment presents a method of a mechanism that manages a bundle state in such a manner that the use of the later-added bundle 315 cannot be suspended by the user.

<Description of Transition in State of Later-Added Bundle (Including Transition in State Involving Locking of Start)>

Figure 14:
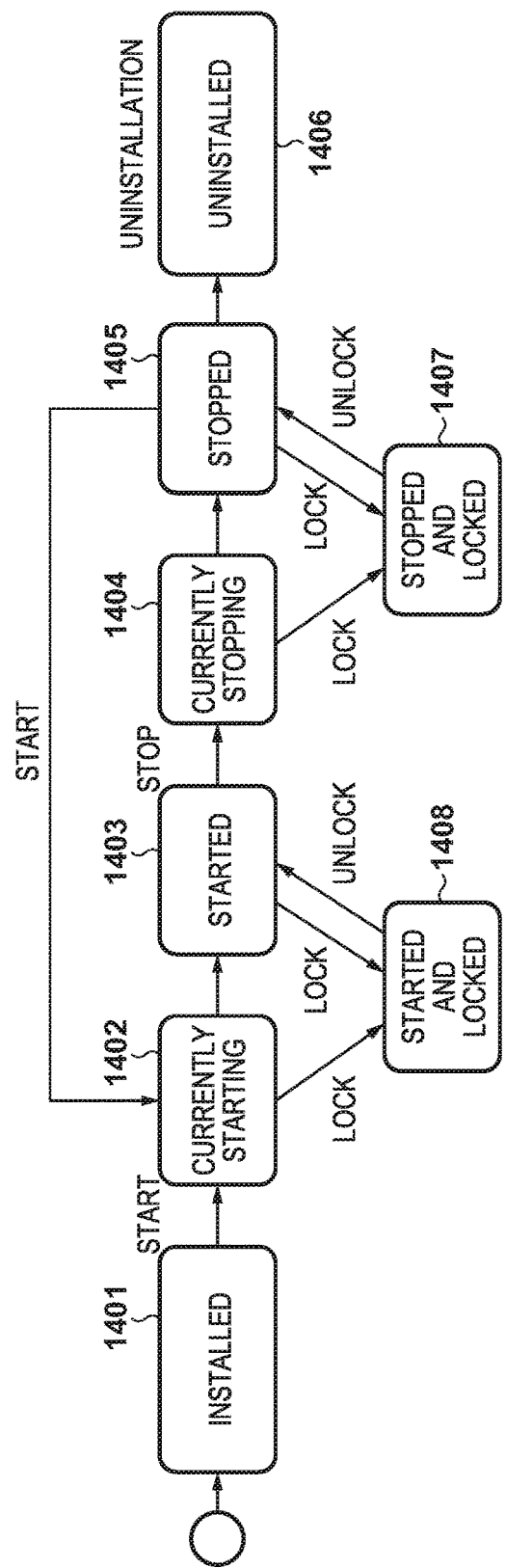
FIG. 14 is a state transition diagram showing a flow from installation to uninstallation of a bundle and a flow to a started and locked state.

FIG. 14 shows a state transition from installation to uninstallation of the later-added bundle 315. When the later-added bundle 315 has been installed via, for example, the application installation UI 401 of the PC 102, its state turns into installed 1401. When the installed later-added bundle 315 does not exist in the image forming apparatus 101, a directory of the later-added bundle 315 to be installed is generated in the deployment destination 510 for the later-added bundle group 314, and setting data is deployed to the same directory at the same time as installation of the later-added bundle 315, as shown in FIG. 5. When the user has issued an instruction for starting the installed later-added bundle 315, the bundle enters a started state 1403 via currently starting 1402. The later-added bundle 315 in the currently starting state 1402 or the started state 1403 can make a transition to a started and locked state 1406, in which the started state cannot make a transition to another state. When the later-added bundle 315 is in the started and locked state 1406, it remains in the started and locked state 1406 until it is unlocked by a module that has unlock authorization. In other words, even if the user has issued a stop instruction to the later-added bundle 315 in the started and locked state 1406, the bundle remains in the started and locked state 1406 without making a transition to a stopped state 1405 via currently stopping 1404. In order to make a transition (stop, uninstall, or update the bundle) from the started and locked state 1406, the bundle needs to return to the started state 1403 through the issuance of an unlock instruction by a module that has lock authorization and unlock authorization. Note that when the image forming apparatus 101 is to shut down, the bundle makes a transition to the stopped state 1405 via currently stopping 1404, and then the image forming apparatus 101 shuts down. In the case of the shut-down of the image forming apparatus 101, the started and locked state of the later-added bundle 315 is stored in shutting down the image forming apparatus 101, and after reactivation, the bundle that was in the started and locked state when the shut-down started makes a transition from the stopped state to the started and locked state. For this purpose, for example, identification information of the bundle in the started and locked state is stored, and the shot-down is performed after the bundle makes a transition to the stopped state. After the image forming apparatus 101 is reactivated, the bundle that was in the started and locked state makes a transition from the stopped state to the started state, and is then locked. In this case, a privileged operation may be performed because unlocking and locking are not performed in response to an external instruction.

When the user has issued an instruction for stopping the later-added bundle in the started state 1403, the bundle makes a transition to the stopped state 1405 via currently stopping 1404. When the later-added bundle 315 is currently stopping 1404 or in the stopped state 1405, it can make a transition to a stopped and locked state 1407. When the later-added bundle 315 is in the stopped and locked state 1407, it remains in the stopped and locked state 1407 until it is unlocked by a module that has unlock authorization. That is to say, when the later-added bundle 315 is in the stopped and locked state 1407, it does not make a transition to the started state 1403 via currently starting 1402 and remains in the stopped and locked state 1407 in response to the user's start instruction. In order for the bundle to make a transition from the stopped and locked state 1407, the bundle needs to return to the stopped state 1405 through the issuance of an unlock instruction by a module that has lock authorization and unlock authorization. The user can issue a start instruction and an uninstallation instruction to the later-added bundle 315 in the stopped state 1405. When the uninstallation instruction has been issued to the later-added bundle 315, the bundle enters an uninstalled state 1408, and the later-added bundle 315 itself and corresponding setting data are deleted from the bundle deployment area 502 of the image forming apparatus 101.

<Description of Example in which Locked State of Started Bundle and Instruction Source that has Issued Lock Instruction are Managed>

FIG. 15 shows a management table that manages whether started bundles are in the locked state or the non-locked state, and further manages modules that have issued a lock instruction to bundles in the locked state. In an example of FIG. 15, App5 is in the started state but is not locked; therefore, the user can issue a stop instruction thereto. App6 is in the started and locked state, and a module specified by the identifier "00000000-0000-0000-0000-000000000002" has issued a lock instruction thereto. As App6 is in the started and locked state, it remains in the started and locked state 1406 unless it receives an unlock instruction from a system managed with the identifier "00000000-0000-0000-0000-000000000002." Therefore, a stop instruction from the user and an unlock instruction from a module with an identifier other than "00000000-0000-0000-0000-000000000002" are invalid.

<Flowchart Illustrating Lock Instruction to Bundle>

Figure 16:
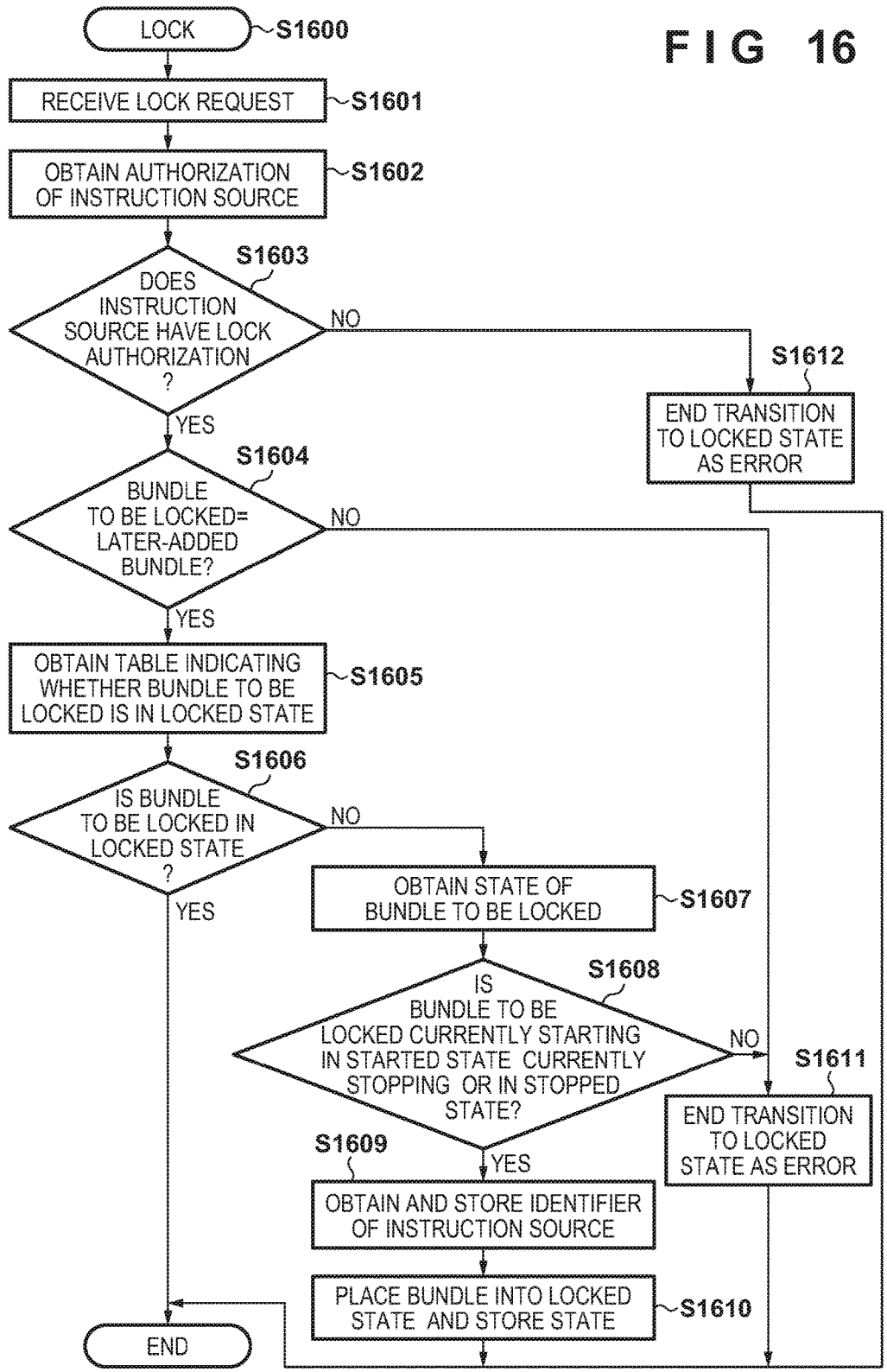
FIG. 16 is a flowchart for locking a bundle.

Using FIG. 16, the following describes a flow of processing for determining a lock instruction source to lock a bundle in the started state or the stopped state. A procedure of FIG. 16 is executed by the lock control service 313 and the CPU 201, which are software and hardware, respectively, as in the case of FIG. 12.

The lock control service 313 receives a lock instruction to a specific bundle (step S1601). This lock instruction contains identification information of the instruction source and identification information of the target bundle. Next, the lock control service 313 obtains authorization of the instruction source that issued the lock instruction (step S1602). The lock control service 313 determines whether the authorization obtained in step S1602 includes authorization to issue a lock instruction (step S1603). If the instruction source does not have the authorization to issue the lock instruction, the processing is ended as an error without placing the bundle into the locked state (step S1612). Whether the instruction source has the authorization can be determined similarly to the first embodiment and the second embodiment.

If it is determined that the instruction source has lock authorization in step S1603, the lock control service 313 determines whether the bundle to be locked is the later-added bundle 315 via the installation control service 312 (step S1604). If the bundle to be locked is not the later-added bundle 315, it is one of the system bundle group 310, and thus the processing is ended as an error without allowing the bundle to make a transition to the locked state (step S1611).

If it is determined that the bundle to be locked is the later-added bundle in step S1604, the lock control service 313 obtains the management table indicating whether the bundle to be locked is already in the locked state from the setting database 304 via the setting data management unit 303 (step S1605). Next, with reference to the management table obtained in step S1605, the lock control service 313 determines whether the bundle to be locked has already been locked (step S1606). If it is determined that the bundle to be locked has already been locked in step S1606, the present flowchart is ended without executing anything. If it is determined that the bundle to be locked is not in the locked state in step S1606, the lock control service 313 obtains the state of the bundle to be locked (shown in FIG. 14, for example) via the installation control service 312 (step S1607). Next, whether the state of the bundle to be locked obtained in step S1607 is currently stopping, the stopped state, currently starting, or the started state is determined (step S1608). If it is determined that the state of the bundle to be locked is currently stopping, the stopped state, currently starting, or the started state in step S1608, the lock control service 313 obtains an identifier of the instruction source, and registers the identifier as the instruction source of the lock instruction to the bundle with the management table of the setting database 304 via the setting data management unit 303 (step S1609). Next, the lock control service 313 changes the state of the bundle to the locked state, and records the current state of the bundle, namely the locked state to the management table of the setting database 304 via the setting data management unit 303 (step S1610). If it is determined that the state of the bundle to be locked is not currently stopping, the stopped state, currently starting, or the started state in step S1608, the processing is ended as an error without allowing the bundle to make a transition to the locked state (step S1611).

As the flow of unlocking is the same as in FIG. 13, a description thereof will be omitted. By implementing the present embodiment, a later-added bundle can be locked while in the started state so that the user cannot stop the later-added bundle. This makes it possible to prevent the user from intentionally stopping a later-added bundle that should operate without fail during the use of the image forming apparatus. Therefore, the present embodiment is effective as means to ensure the use of the functions of the later-added bundle without fail.

As described above, according to the first to third embodiments, a designated bundle can be locked while in the stopped state. As a locked bundle cannot be unlocked without authorization, the use of an application program, for example, a bundle can be restricted or suspended without being uninstalled and deleted. In this way, when the use of the bundle is allowed to be restarted, user data before the suspension of the use of the bundle is rendered usable, and the continuous use of the bundle can be restarted. Furthermore, according to the second and third embodiments, only a user who locked an application is allowed to restart the locked application. Therefore, an unauthorized user cannot restart the locked application at his/her discretion. Furthermore, according to the third embodiment, not only an application in the stopped state, but also an application in the started state, that is to say, an application that is in operation can be locked. Therefore, a user who does not have lock authorization, such as a user of the application, can be prevented from stopping the application without authorization.

[Other Embodiments]

In the above-described embodiments, the state of a bundle is determined before locking the bundle, and the bundle is locked if the bundle is in a predetermined state, for example, currently stopping, the stopped state, currently starting, or the started state. However, when an application is to be placed in the stopped and locked state, the application may be forcedly placed into the stopped state and then locked while in the stopped state. The same goes for a case in which an application is to be locked while in the started state (that is to say, while in operation). In order to lock an application in operation, the application may be forcedly brought into operation and then locked while in operation. Although the embodiments allow a later-added bundle to be locked, whether or not to allow locking of a bundle may be determined based on identification information of the bundle.

A bundle installed in the image forming apparatus may be an application that uses one or both of the scanner unit and the printer unit of the image forming apparatus for the purpose of expanding the functions of the image forming apparatus. In this case, the application itself may directly use the scanner unit and the printer unit with the use of a library that is provided in the image forming apparatus to use the scanner unit and the printer unit. Alternatively, the application may indirectly use the scanner unit and the printer unit; specifically, the application may use a service provided by a server, and the service may use the scanner unit and the printer unit with the use of an interface that is provided in the image forming apparatus to externally provide the scanner unit and the printer unit. A bundle installed in the image forming apparatus may be an application that does not use the scanner unit and the printer unit of the image forming apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-244540, filed Dec. 16, 2016 which is hereby incorporated by reference herein in its entirety.

What is claimed is:

1. An information processing apparatus capable of executing applications, the information processing apparatus comprising:

a processor; and a memory which stores a program for causing the processor, when executed by the processor, to act as:

a lock unit that, in response to a lock instruction, changes a state of a designated application to a locked state, wherein the designated application in the locked state is not usable and does not allow a transition to another state unless the designated application becomes unlocked;

an unlock unit that, in response to an unlock instruction from an instruction source that has authority for unlocking an application, unlocks the locked state of the designated application; and a change unit that changes a state of an application based on whether or not the application is in the locked state and whether a state-change-instruction is received from an instruction source that has authority for changing the state of the application, wherein the change unit does not change the state of the application in a case where the application is in the locked state when the state-change-instruction is received, regardless of whether the instruction source has the authority for changing the state of the application.

2. The information processing apparatus according to claim 1, wherein
the lock unit changes the state of the designated application to the locked state when the lock instruction has been issued by an instruction source that has authorization.

3. The information processing apparatus according to claim 1, wherein
the unlock unit unlocks the locked state of the designated application when the instruction source of the unlock instruction is the same as the instruction source of the instruction that has changed the state of the application whose locked state is to be cancelled to the locked state.

4. The information processing apparatus according to claim 1, wherein the processor, executes the program stored in the memory, to further act as:
an uninstallation unit that uninstalls the application based on an uninstallation instruction from an instruction source that has authority for uninstalling the application, wherein the uninstallation unit does not uninstall the application when the application is in the locked state regardless of whether the uninstallation instruction has been received from the instruction source that has the authority for uninstalling the application.

5. The information processing apparatus according to claim 1, wherein
the application requires a fee to be used.

6. The information processing apparatus according to claim 1, further comprising
state management data that contains identification information of applications in association with information indicating whether the applications are in a locked state, wherein
when the designated application has been changed to the locked state, the lock unit stores identification information of the application that has been changed to the locked state and information indicating that the application is in the locked state to the state management data, and
in response to the unlock instruction, the unlock unit determines whether the application to which the unlock instruction has been issued is in the locked state with reference to the state management data, and when the application is in the locked state, changes the information in the state management data indicating that the application is in the locked state to information indicating that the application is not in the locked state.

7. The information processing apparatus according to claim 6, wherein
the state management data further contains identification information of the instruction source of the lock instruction,
the lock unit stores the identification information of the instruction source of the lock instruction in association with the identification information of the application that has been changed to the locked state, and
in response to the unlock instruction, the unlock unit refers to the state management data, and changes the information indicating that the application is in the locked state to the information indicating that the application is not in the locked state when the identification information of the instruction source of the lock instruction corresponding to the application to which the unlock instruction has been issued matches identification information of the instruction source of the unlock instruction.

8. The information processing apparatus according to claim 1, further comprising
a user interface, wherein
both or one of the lock instruction and the unlock instruction is issued by a user via the user interface.

9. The information processing apparatus according to claim 1, wherein
both or one of the lock instruction and the unlock instruction is issued by one of the applications.

10. The information processing apparatus according to claim 1, further comprising
a scanner; and
a printer, wherein
the application directly or indirectly uses one or both of the scanner and the printer.

11. The apparatus according to claim 1, wherein a user who has the authority for locking the application is different from a user who has the authority for changing the state of the application.

12. The apparatus according to claim 1, wherein the lock unit controls the designated application to lock or not to lock the application based on the state of the designated application and the lock instruction from the instruction source that has the authority for locking the application.

13. The apparatus according to claim 1, wherein the lock unit locks the designated application according to the lock instruction in a case where the designated application is in a stopped state or a stopping state, and does not lock the designated application regardless of the lock instruction in a case where the designated application is in neither the stopped state nor the stopping state.

14. The apparatus according to claim 1, wherein the lock unit locks the designated application according to the lock instruction in a case where the designated application is in a stopped state or a stopping state, and does not lock the designated application regardless of the lock instruction in a case where the designated application is in a started state or a starting state.

15. A non-transitory computer-readable medium having stored therein a program that causes a computer capable of executing applications to execute an application management method, the application management method comprising:
in response to a lock instruction, changing a state of a designated application to a locked state, wherein the designated application in the locked state is not usable and does not allow a transition to another state unless the designated application becomes unlocked;
in response to an unlock instruction from an instruction source that has authority for unlocking an application, unlocking the locked state of the designated application; and
changing a state of an application based on whether or not the application is in the locked state and whether a state-change-instruction is received from an instruction source that has authority for changing the state of the application,
wherein the changing does not change the state of the application in a case where the application is in the locked state when the state-change-instruction is received, regardless of whether the instruction source has the authority for changing the state of the application.

16. The non-transitory computer-readable medium according to claim 15, wherein a user who has the authority for locking the application is different from a user who has the authority for changing the state of the application.

17. The non-transitory computer-readable medium according to claim 15, wherein the designated application is controlled to be locked or not to be locked based on the state of the designated application and the lock instruction from the instruction source that has the authority for locking the application.

18. The non-transitory computer-readable medium according to claim 15, wherein the designated application is locked according to the lock instruction in a case where the designated application is in a stopped state or a stopping state, and the designated application is not locked regardless of the lock instruction in a case where the designated application is in neither the stopped state nor the stopping state.

19. The non-transitory computer-readable medium according to claim 15, wherein the designated application is locked according to the lock instruction in a case where the designated application is in a stopped state or a stopping state, and the designated application is not locked regardless of the lock instruction in a case where the designated application is in a started state or a starting state.

20. An application management method used in an information processing apparatus capable of executing applications, the application management method comprising:

in response to a lock instruction, changing a state of a designated application to a locked state, wherein the designated application in the locked state is not usable and does not allow a transition to another state unless the designated application becomes unlocked;

in response to an unlock instruction from an instruction source that has authority for unlocking an application, unlocking the locked state of the designated application; and changing a state of an application based on whether or not the application is in the locked state and whether a state-change-instruction is received from an instruction source that has authority for changing the state of the application, wherein the changing does not change the state of the application in a case where the application is in the locked state when the state-change-instruction is received, regardless of whether the instruction source has the authority for changing the state of the application.

* * * * *